United States Patent

Neudecker et al.

[15] 3,662,666

[45] May 16, 1972

[54] PHOTOGRAPHIC APPARATUS WITH ADJUSTABLE FILTER

[72] Inventors: Karl Neudecker, Munich; Friedrich Winkler, Unterhaching, both of Germany

[73] Assignee: Afga-Gevaert Aktiengesellschaft, Leverkusen, Germany

[22] Filed: June 11, 1970

[21] Appl. No.: 45,485

[30] Foreign Application Priority Data

June 19, 1969 Germany......................G 69 24 527.8

[52] U.S. Cl. .............................................95/11 L, 95/11 R
[51] Int. Cl. .......................................................G03b 19/00
[58] Field of Search ..........................................95/11 R, 11 L

[56] References Cited

UNITED STATES PATENTS 3,469,514  9/1969  Denk ..........................................95/11

3,395,630  8/1968  Haufler et al. ..............................95/11

FOREIGN PATENTS OR APPLICATIONS 1,285,291  12/1968  Germany.................................95/11 L
1,272,109  7/1968   Germany...................................95/11

*Primary Examiner*—Samuel S. Matthews
*Assistant Examiner*—Richard L. Moses
*Attorney*—Michael S. Striker

[57] ABSTRACT

A photographic camera wherein a filter is moved away from the path of incoming scene light in response to attachment of a source of artificial light. The filter is also movable by way of a manually operated selector which can be locked in a position corresponding to inoperative position of the filter. The selector is automatically unlocked in response to attachment of the light source but continues to hold the filter away from the path of incoming light as long as the light source remains attached. A spring returns the filter into the path of incoming light when the light source is detached so that the camera is then ready for making of exposures in daylight.

13 Claims, 4 Drawing Figures

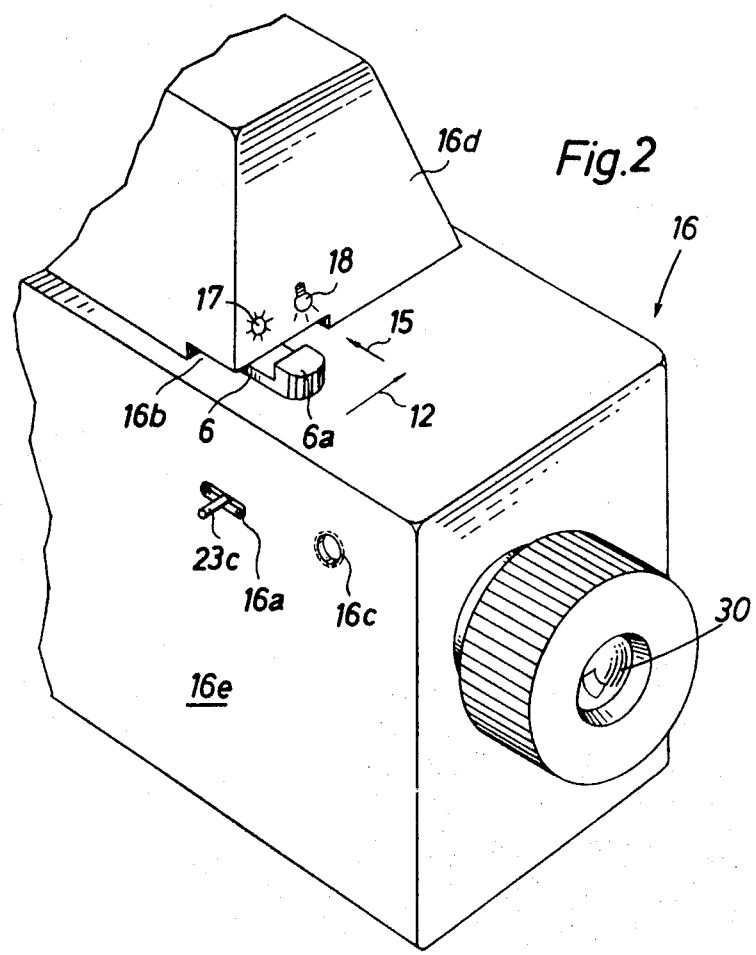

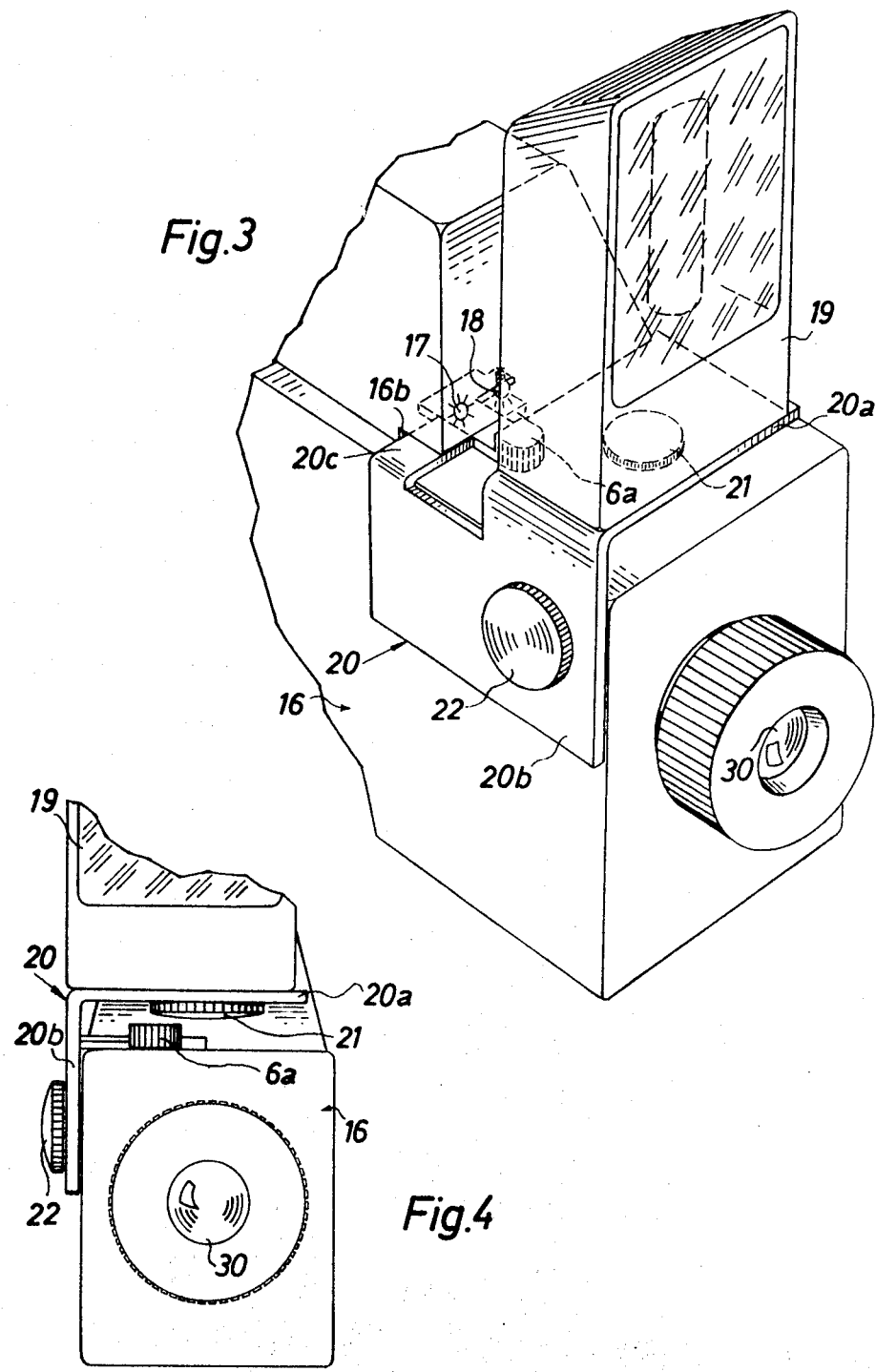

PHOTOGRAPHIC APPARATUS WITH ADJUSTABLE FILTER

BACKGROUND OF THE INVENTION

The present invention relates to photographic apparatus in general, and more particularly to improvements in still cameras or motion picture cameras of the type wherein one or more filters are movable into and from the path of incoming scene light.

Many photographic apparatus are provided with filters which are movable into and from the path of incoming scene light. As a rule, a filter is moved into the path of light when the apparatus is to make exposures in daylight and such filter is moved way from the path of incoming light when the apparatus is to make exposures with artificial illumination of the scene or subject. It is also known to employ in a photographic apparatus a grey filter which can be moved either by hand or by a flash unit or another source of artificial light. A drawback of such apparatus is that the filter remains in the selected position so that, if the operator forgets to reset the filter subsequent to detachment of the light source, the apparatus is likely to make unsatisfactory exposures because the filter does not extend across the path of incoming light when the exposures are thereupon made in daylight.

SUMMARY OF THE INVENTION

An object of the invention is to provide a photographic apparatus with a novel and improved mechanism which automatically insures that one or more filters are held in an optimum position when the camera is used for making of exposures in daylight or with a source of artificial light.

Another object of the invention is to provide a photographic apparatus wherein the filter or filters can be locked in one position but are still automatically movable to the other position when the circumstances during picture taking necessitate placing of the filter or filter into such other position.

A further object of the invention is to provide the photographic apparatus with an improved support for flash units and/or other sources of artificial light which cooperates with the filter moving mechanism in a novel and improved way.

An additional object of the invention is to provide a relatively compact, simple, rugged and reliable filter moving mechanism which can be installed in a still camera or in a motion picture camera without necessitating substantial alterations in the design of the camera.

A concomitant object of the invention is to provide a filter moving mechanism which is sufficiently simple to insure that its functioning and manipulation can be readily comprehended by beginners and amateur photographers.

An ancillary object of the invention is to provide a filter moving mechanism which is designed and mounted in and on the housing or body of a camera in such a way that the position of the filter or filters can be readily determined at least at one point, for example, by looking through the view finder of the camera.

The invention is embodied in a photographic apparatus which comprises a housing supporting an objective which admits scene light along a predetermined path, filter means including one or more filters movable in the housing between an operative position in the path and an inoperative position away from the path of incoming light, a mechanism for moving the filter means including a manually operable selector movable between a first position corresponding to one position of the filter means, a second or intermediate position corresponding to the other position of the filter means, and a locked third position also corresponding to the other position of the filter means (preferably to inoperative position of the filter means), and an accessory movable with reference to the housing between attached and detached positions. The accessory comprises at least one source of artificial light and displacing means operative to effect movement of the selector to second position in response to movement of the accessory to attached position.

The displacing means preferably comprises a first portion which can move the selector from first to second position and a second portion which can move the selector from third to second position, depending on the position of the selector in detached position of the accessory. In this way, the selector is compelled to assume the second position as long as the accessory remains attached to the housing. The photographic apparatus is further provided with means for biasing the selector from second position to at least one of the first and third positions, preferably to first position to thus insure that the filter means extends across the path of incoming light when the accessory is detached; the apparatus is then ready to make exposures in daylight.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary perspective view of a photographic apparatus which embodies the filter moving mechanism of FIG. 1;

FIG. 3 is a similar fragmentary perspective view, further showing an accessory including a source of artificial light connected to the housing of the photographic apparatus; and FIG. 4 is a fragmentary front elevational view of the apparatus and accessory shown in FIG. 3.

DESCRIPTION OF THE PREFERRED EMBODIMENTS

Figure 1:
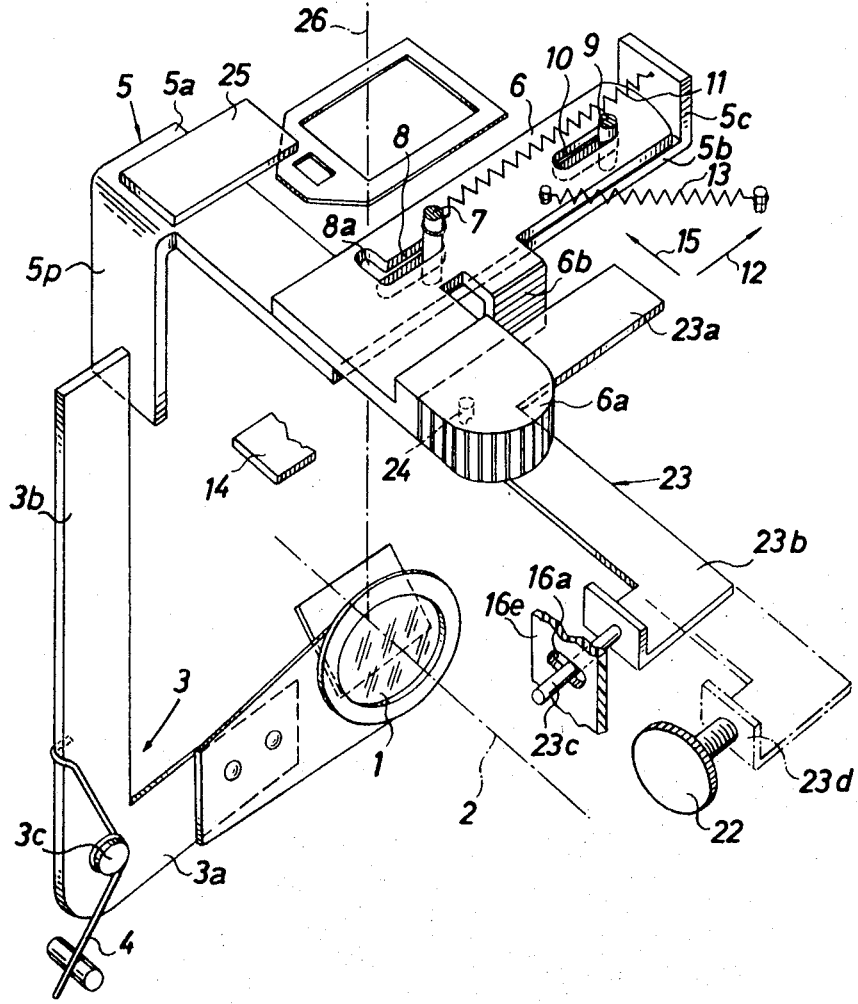
FIG. 1 is a perspective view of a filter moving mechanism with the filter shown in a position in which it extends across the path of incoming scene light.

Referring first to FIG. 1, there is shown a portion of a photographic apparatus including a filter 1 held in an operative position in which it extends across the optical axis 2 of the picture taking objective 30, i.e., across the path of incoming scene light. The filter 1 is mounted on one arm 3a of a carrier 3 here shown as a two-armed lever fulcrumed at 3c and biased clockwise by a torsion spring 4 which tends to move the upwardly extending arm 3b of the carrier 3 into abutment with a fixed stop 14. When the arm 3b of the carrier 3 is held in abutment with the stop 14, the filter 1 assumes an inoperative position in which it is located below and is remote from the optcial axis 2.

The arm 3b of the carrier 3 is constantly biased against the downwardly extending projection 5p of a blocking member or slide 5 having an elongated portion 5a which is parallel with the optical axis 2 and from which the projection 5p extends downwardly. The blocking member 5 further comprises a portion 5b which extends at right angles to the portion 5a and optical axis 2 and serves as a carriage for a reciprocable selector 6. The blocking member 5 and selector 6 are reciprocable along stationary guide pins 7,9 and are provided with elongated guide slots 8,10 through which the pins 7,9 extend. A coupling spring 11 is attached to the pin 7 and to an upstanding lug 5c of the portion 5b to bias the blocking member 5 in a direction counter to that indicated by the arrow 12. The path of movement of the selector 6 and blocking member 5 along the pins 7,9 is normal to the optical axis 2. The positions shown in FIG. 1 are the starting or first positions of the blocking member 5 and selector 6. The slot 8 of the selector 6 has an extension 8a which is substantially parallel to the optical axis 2. This selector is further provided with a handgrip portion or knob 6a which is accessible at the outer side of the camera body or housing 16 (see FIG. 2) and by means of which the selector 6 can be moved in and counter to the direction indicated by the arrow 15 as well as in and counter to the direction indicated by the arrow 12. A second helical spring 13 is connected to the camera housing 16 and to the selector 6; its function is to pivot the selector about the pin 9 in a counterclockwise direction, as viewed in FIG. 1, when the pin 7 is located in the leftmost portion of the slot 8 so that the pin 7 can enter the extension 8a. The selector 6 is then locked in a third position in which the projection 5p of the blocking member 5 is located to the right of the position shown in FIG. 1 so that the torsion spring 4 can maintain the filter 1 at a level below and out of registry with the optical axis 2. In such locked (third) position of the carrier 3, the arm 3b of the carrier 3 abuts against the stop 14. The blocking member 5 shares the movement of the selector 6 in the direction of the arrow 12 because the right-hand end face of the selector bears against the lug 5c under the action of the coupling spring 11.

The filter 1 is held in the illustrated operative position when the camera is to make exposures in daylight. For exposures with artificial illumination of the scene, the filter 1 should be moved to the inoperative position in which the scene light can reach a film frame behind the objective 30 without passing through the filter.

In order to unlock the selector 6 and to return the parts 5 and 6 to the first or starting positions shown in FIG. 1, the operator of the photographic apparatus must push the knob 6a in the direction indicated by the arrow 15 against the opposition of the spring 13 so that the pin 7 enters the leftmost portion of the slot 8. The spring 11 is thereupon free to contract and moves the parts 5,6 in a direction counter to that indicated by the arrow 12 until the pins 7,9 respectively enter the rightmost portions of the respective slots 8,10.

FIG. 2 shows that a wall 16d of the housing 16 is provided with two symbols 17,18 which are adjacent to the path of movement of the knob 6a and enable the operator to detect the positions of the blocking member 5 and selector 6. When the knob 6a registers with the sun symbol 17, the operator knows that the filter 1 is located in the path of incoming scene light. The placing of the knob 6a into registry with the flash bulb symbol 18 indicates that the filter 1 has been moved out of the way of incoming scene light.

FIG. 3 illustrates an accessory including a source 19 of artificial light, e.g., an electronic flash unit. This source is connected with the housing of the photographic apparatus by a support in the form of a bracket 20 which also forms part of the aforementioned accessory. The bracket 20 includes a first arm 20a which is separably connected to the underside of the source 19 by a screw 21 or an analogous fastener. Another arm 20b constitutes a first displacing portion of the bracket 20 and carries a permanently secured rotary tripod fastener or screw 22 whose stem is threaded into a tapped bore 16c provided in a side wall 16e of the housing 16 of the photographic apparatus. The configuration of the bracket 20 is such that, when the screw 22 is secured to the housing, the arm 20a and the screw 21 are located at a level above the knob 6a (see also FIG. 4). The bracket 20 further comprises a third arm 20c which constitutes a second displacing portion and enters a recess 16b in the housing 16 of the photographic apparatus when the screw 22 is properly received in the bore 16c. The arm 20c is parallel with the arm 20a. By entering the recess 16b, the arm 20c insures that the light source 19 is installed in an optimum position for making of exposures with flash.

Referring again to FIG. 1, the filter moving mechanism of the photographic apparatus further comprises an unlocking or releasing member 23 having an arm 23a which abuts against a downwardly extending lug 6b of the selector 6. The front face of the lug 6b is parallel to the slots 8 and 10. A second arm 23b of the unlocking member 23 carries a projection or stud 23c which extends outwardly through an elongated aperture 16a provided in the side wall 16e of the housing 16. The unlocking member 23 is a lever which is pivotable on a fixed pin 24.

It is assumed that the selector 6 and the blocking member 5 are held in the first positions shown in FIG. 1 and that the operator is about to attach the accessory including the bracket 20 and the light source 19. The arm 20c of the bracket 20 enters the recess 16b of the housing 16 and pushes the selector 6, together with the locking member 5, in the direction indicated by the arrow 12 but not all the way to the position in which the spring 13 can pivot the selector in order to introduce the pin 7 into the extension 8a.

The displacement of the blocking member 5 and selector 6 to such second or intermediate positions suffices to enable the torsion spring 4 to move the filter 1 away from the optical axis 2 but the arm 3b of the carrier 3 does not abut against the stop 14. The bracket 20 is then fixed to the housing 16 by the screw 22 so that the arm 20c remains in the recess 16b and prevents return movement of the selector 6 and blocking member 5 to the first positions shown in FIG. 1. When the operator thereupon decides to detach the accessory, the arm 20c is withdrawn from the recess 16b and the spring 11 is free to contract so as to return the blocking member 5 and selector 6 to the first positions shown in FIG. 1, i.e., the filter 1 is again located in the path of incoming scene light and the apparatus is ready for the making of exposures in daylight.

It can happen that the operator wishes to attach the bracket 20 to the housing 16 at a time when the pin 7 is received in the extension 8a of the slot 8, i.e., when the arm 3b abuts against the stop 14 and the selector 6 is locked in its third position. In the absence of some means for automatically unlocking the selector 6 prior to detachment of the bracket 20, the operator would be likely to forget to reset the selector 6 so that the exposure in daylight would be made with scene light whose intensity was not weakened by the filter 1. Such unlocking is effected by the member 23 whose projection 23c extends outwardly through the aperture 16a and is pivoted by the displacing arm 20b of the bracket 20. The unlocking member 23 then pivots counterclockwise (arrow 15) about the axis of the pin 24 and its arm 23a pivots the selector 6 clockwise about the pin 9 until the pin 7 enters the slot 8 and the parts 5,6 can move under the action of the spring 11 until the blocking member 5 strikes against the arm 20c of the bracket 20. Thus, the unlocking member 23 insures that the selector 6 and the blocking member 5 automatically assume their intermediate or second positions (in which the filter 1 is held away from the path of incoming scene light) when the light source 19 is properly mounted on the housing 16, irrespective of whether the operator decides to attach the bracket 20 at a time when the parts 5,6 are held in the first positions of FIG. 1 or the selector 6 is locked in its third position in which the pin 7 extends into the extension 8a. Consequently, whenever the bracket 20 is detached from the housing 16, the selector 6 and the blocking member 5 automatically assume their first positions to thus insure that the filter 1 is located in the path of incoming scene light and that the camera is ready to make exposures in daylight.

The projection 23c of the unlocking lever 23 and the aperture 16a of the housing 16 can be omitted if the connecting screw 22 is used as a displacing means for pivoting the unlocking member 23 in a counterclockwise direction. This modification is indicated in FIG. 1 wherein the arm 23b of the unlocking member 23b comprises an end portion 23d adjacent to the tapped bore 16c so that it can be engaged and displaced by the stem of the screw 22. The ensuing pivotal movement of the unlocking member 23 suffices to release the selector 6, i.e., to move the selector in a direction to place the pin 7 into the left-hand end portion of the slot 8. The spring 11 then moves the parts 5,6 to their intermediate positions in which the member 5 abuts against the displacing arm 20c.

FIG. 1 further shows that the blocking member 5 comprises a plate-like marker 25 which is observable by looking through the view finder 31 (see the light beam 26) when the filter 1 is moved away from the optical axis 2. Thus, the operator need not observe the aforementioned symbols 17,18; merely by looking through the view finder 31, the user of the photographic apparatus knows whether or not the filter 1 assumes or is away from the operative position shown in FIG. 1.

The improved photographic apparatus is susceptible of many additional modifications. For example, the connection between the bracket 20 and light source 19 may comprise a tripod screw and the connection between the bracket and the housing 16 may include a plug-in blade, a rail, a universal joint or the like. It is also within the purview of our invention to mount the filter 1 or two or more filters in such a way that each filter extends across the path of incoming scene light when the apparatus is used for making of exposures with flash or another source of artificial illumination. Also, one of several filters can be located in the path of incoming light when another filter is away from such path, and the other filter is then located in the path when the one filter is moved away.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. In a photographic apparatus, a combination comprising a housing; an objective mounted in said housing to admit scene light along a predetermined path; filter means movable in said housing between an operative position in said path and an inoperative position away from said path; a mechanism for moving said filter means in said housing, including a manually operable selector movable between a first position corresponding to one position of said filter means, a second position corresponding to the other position of said filter means and a locked third position again corresponding to said other position of said filter means; and an accessory movable with reference to said housing between attached and detached positions, said accessory including a source of artificial light and displacing means operative to effect movement of said selector to second position in response to movement of said accessory to said attached position.

2. A combination as defined in claim 1, wherein said displacing means comprises first and second portions respectively operative to effect movement of said selector to said second position from the first and third positions of said selector so that, when said accessory is attached to said housing, said selector automatically assumes said second position irrespective of the selector's position in the detached position of said accessory.

3. A combination as defined in claim 1, wherein said other position is the inoperative position of said filter means.

4. A combination as defined in claim 1, further comprising means for biasing said selector to said first position to automatically move the selector to such first position in response to movement from said locked third position in detached position of said accessory.

5. A combination as defined in claim 4, further comprising pin-and-slot means for guiding said selector during movement between said positions thereof.

6. A combination as defined in claim 5, wherein said pin-and-slot means includes a slot having two mutually inclined portions and a pin extending into said slot, said pin being located in one of said portions in the first and second positions and in the other portion of said slot in the third position of said selector.

7. A combination as defined in claim 1, wherein said accessory further comprises a support for said source and said displacing means forms part of said support.

8. A combination as defined in claim 1, wherein said mechanism further comprises a movable unlocking member cooperating with said displacing means to move the selector from third to second position in response to attachment of said accessory.

9. A combination as defined in claim 8, wherein said unlocking member comprises a lever pivotably mounted in said housing and having a first arm pivotable by said displacing means and a second arm arranged to move said selector from third to second position in response to pivoting of said first arm.

10. A combination as defined in claim 9, wherein said housing has an aperture and said first arm includes a projection extending outwardly through and beyond said aperture, said accessory further comprising a support for said source, said displacing means forming part of said support and being arranged to pivot said first arm by way of said projection in response to movement of the accessory to said attached position.

11. A combination as defined in claim 9, wherein said displacing means comprises fastener means which secures said accessory to said housing in said attached position.

12. A combination as defined in claim 8, wherein said displacing means comprises a first portion which cooperates with said unlocking member, and a second portion arranged to move the selector from first to second position in response to attachment of said accessory so that the selector automatically assumes said second position in response to such attachment irrespective of the position of said selector in detached position of said accessory, said selector engaging the second portion of said displacing means in the second position thereof while the accessory is attached to said housing.

13. A combination as defined in claim 12, further comprising means for biasing said selector from second position to at least one of said first and third positions.

* * * * *